Feb. 27, 1951 — H. KOSKI — 2,543,581
INFUSION DEVICE
Filed Feb. 20, 1946 — 2 Sheets-Sheet 1
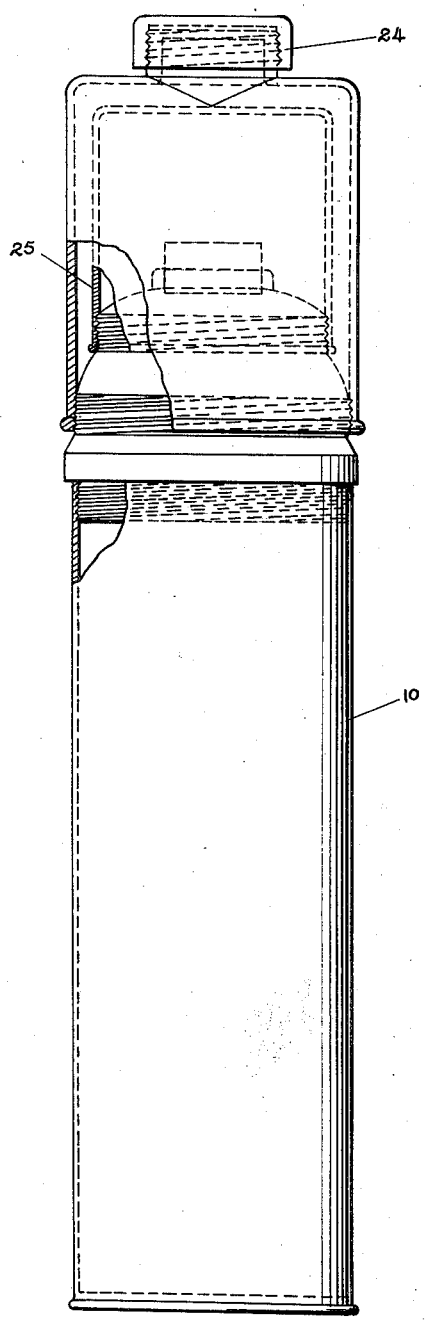
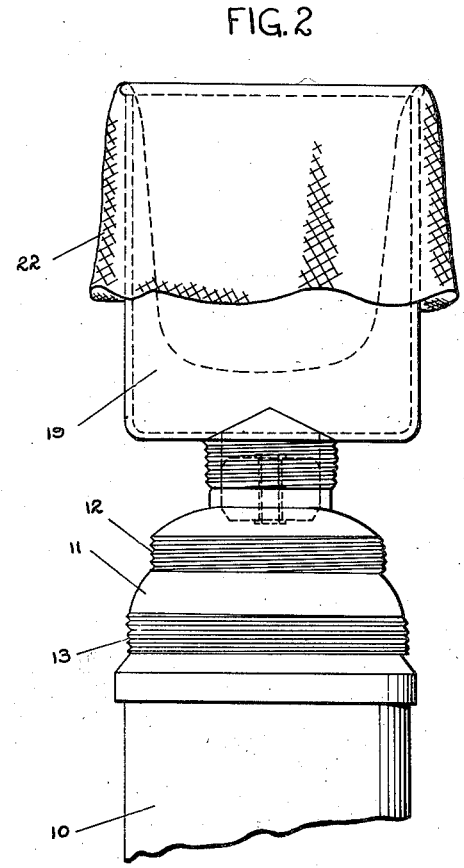
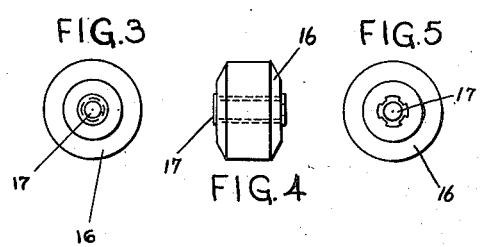
INVENTOR.
Hans Koski
BY Victor J. Evans & Co.
ATTORNEYS Feb. 27, 1951　　　　H. KOSKI　　　　2,543,581
INFUSION DEVICE
Filed Feb. 20, 1946　　　　　　　　　　2 Sheets-Sheet 2
FIG. 6
FIG. 7　　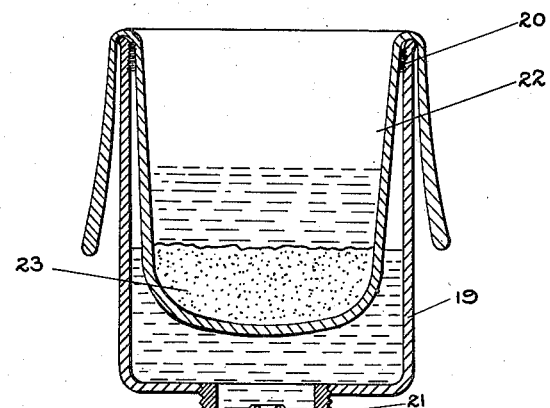　　FIG. 8
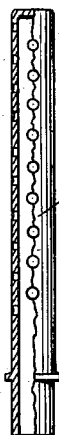
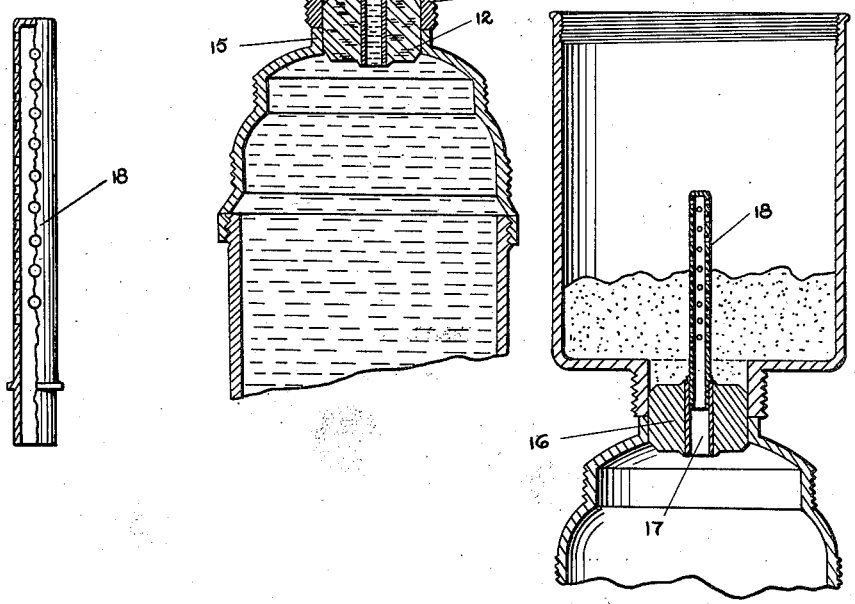
INVENTOR.
Hans Koski
BY Victor J. Evans & Co.

Patented Feb. 27, 1951

2,543,581

UNITED STATES PATENT OFFICE 2,543,581

INFUSION DEVICE

Hans Koski, Choteau, Mont.

Application February 20, 1946, Serial No. 648,939

1 Claim. (Cl. 99—305)

The invention relates to a bottle, and more especially to a Thermos bottle or container.

The primary object of the invention is the provision of a bottle or container of this character, wherein it can be more readily filled and the content therefor strained during filling, the bottle or container being of novel construction and is unique in the arrangement of the parts thereof.

Another object of the invention is the provision of a bottle of this character, wherein coffee or tea can be made during the act of filling thereof, which is accomplished through the use of a cup-like cap for such bottle, this cap being also adaptable for drinking purposes in consuming the content when dispensed from the bottle.

A further object of the invention is the provision of a bottle of this character, which is simple in construction thoroughly reliable and effective for the purpose thereof, strong, durable, readily and easily operated for the making of a beverage thereby, the dispensing of such beverage, and the storing of the latter for the servicing thereof, and inexpensive to manufacture.

With these and other objects in view the invention consists in the features of construction, combination and arrangement of parts as will be hereinafter more fully described, illustrated in the accompanying drawings, which show the preferred embodiment of the invention, and pointed out in the claim hereunto appended.

In the accompanying drawings:

Figure 1 is a side view, partly-broken away, of the bottle constructed in accordance with the invention, Figure 2 is a fragmentary side view showing the bottle arranged for making a beverage, either coffee or tea during the filling operation of such bottle.

Figure 3 is a plan view of an inlet cork for the bottle.

Figure 4 is a side view thereof.

Figure 5 is a view similar to Figure 3 looking toward the other end thereof.

Figure 6 is a vertical central sectional view of the structure shown in Figure 2.

Figure 7 is a side view, partly broken away of the strainer nozzle detached.

Figure 8 is a view similar to Figure 6 showing the strainer nozzle in place.

Similar reference characters indicate corresponding parts throughout the several views in the drawings.

Referring to the drawings in detail, the bottle constituting the present invention, comprises a cylindrical body 10 having a stepped neck area 11 with a contracted filling and pouring mouth 12, the steps in the neck being formed external screw threads 13 and 14, respectively, and this neck area may be an integral section or a separable section optionally. Within the rim flange 15 of the mouth 12 is adapted to be detachably fitted a centrally bored pouring cork 16, its bore being lined with a tubular coupling nipple 17, in which is detachably inserted a perforated strainer nozzle 18 adapted to upstand vertically therefrom when coupled therewith.

Adapted to be superposed on the rim flange 15 of the mouth 12 is a cup-like cap 19 when inverted from a capping position, which at the internally threaded portion 20 thereof engages the threaded step 13, has its contracted pouring spout 21 resting on the flange 15, with the said spout frictionally engaging the cork 16, and in this position the cap 19 affords a beverage making cup, as best seen in Figure 6 of the drawings. In this beverage making instance a strainer cloth or the like 22 is bagged over the cap 19, and the beverage substance 23 is placed therein, whence on the pouring of hot water into the cup the liquid beverage will be made as the mixture percolates and deposits within the bottle body through the nipple 17, the nozzle 18 being not used for straining purposes in this instance. As shown in Figure 8 of the drawings the nozzle 18 is in position for use, it being a substitute for the cloth or the like 22, and tea or coffee can be conveniently made in this manner.

The spout 21 is externally threaded for the detachably fitting of a closure plug or member 24 thereto, so that such cap 19 can be converted into a drinking cup on detachment from that position shown in Figures 6 and 8 of the drawings. Or this plug or member 24 will seal the cap 19, when capping the bottle body, as shown in Figure 1 of the drawings.

Supplementing the cap 19 is an inner detachable cup-like cap 25 for engaging the step 13 of the neck area 11, which cap 25 is housed by the cap 19, as best seen in Figure 1 of the drawings, and such figure shows the normal assembly of the device for the storing of the content thereof.

The device is thoroughly sanitary, it being susceptible of easy cleaning and also permits beverage making directly therewith with dispatch during the filling of the bottle.

What is claimed is:

In a filling and straining attachment for a Thermos bottle, having a cylindrical body provided with a neck area and a restricted mouth, and an annular flange projecting from said body adjacent the restricted mouth thereof, the improvement comprising a cork provided with a central bore positioned in said flange, a tubular nipple of the same length as the thickness of the cork so that the ends of the nipple terminate at the top and bottom surfaces of the cork seated in the bore in said cork, a strainer nozzle detachably positioned in the top of said tubular nipple, a cup-shaped filling cap provided with a constricted spout adapted to be detachably engaged with the periphery of said annular flange, said spout frictionally engaging the outer periphery of said cork.

HANS KOSKI.

REFERENCES CITED

The following references are of record in the file of this patent:

UNITED STATES PATENTS

| Number | Name | Date |
|---|---|---|
| 35,747 | Ernst | July 1, 1862 |
| 797,478 | Welles | Aug. 15, 1905 |
| 1,167,259 | Bleichrode | Jan. 4, 1916 |
| 1,316,154 | Gauss | Sept. 16, 1919 |
| 1,713,836 | Lamar | May 21, 1929 |
| 1,891,826 | McGinnis | Dec. 20, 1932 |
| 1,953,291 | DeVry | Apr. 3, 1934 |
| 2,245,389 | Cremer | June 10, 1941 |
| 2,292,504 | Bennett | Aug. 11, 1942 |
| 2,345,876 | Kehrtz | Apr. 4, 1944 |

FOREIGN PATENTS

| Number | Country | Date |
|---|---|---|
| 9,717 | Great Britain | 1843 |
| 14,342 | Great Britain | 1907 |
| 17,755 | Great Britain | June 13, 1913 |